United States Patent
Chen et al.

(10) Patent No.: US 8,032,170 B2
(45) Date of Patent: Oct. 4, 2011

(54) METHOD FOR ADDRESSING BROADCAST MESSAGE IN A TRUNKING SYSTEM

(75) Inventors: Yanye Chen, Shenzhen (CN); Xuemin Liu, Shenzhen (CN); Chenguang Zhang, Shenzhen (CN); Xiaoxia Hou, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 798 days.

(21) Appl. No.: 12/063,537

(22) PCT Filed: Aug. 18, 2005

(86) PCT No.: PCT/CN2005/001294
§ 371 (c)(1),
(2), (4) Date: Feb. 11, 2008

(87) PCT Pub. No.: WO2007/019731
PCT Pub. Date: Feb. 22, 2007

(65) Prior Publication Data
US 2010/0105371 A1    Apr. 29, 2010

(51) Int. Cl.
*H04B 7/00* (2006.01)
(52) U.S. Cl. ..... 455/520; 455/416; 455/426; 455/452.1; 455/453; 455/516; 455/519; 455/518; 455/509
(58) Field of Classification Search ............... 455/416, 455/426.1, 452.1, 453, 516, 519, 518, 509
See application file for complete search history.

(56) References Cited

U.S. PATENT DOCUMENTS

2003/0144018 A1* 7/2003 Minnick et al. ............... 455/519
2005/0169203 A1* 8/2005 Sinnarajah et al. ........... 370/312

OTHER PUBLICATIONS

ZTE, "Signaling Link Access Control (LAC) Standard for cdma2000 Spread Spectrum Systems—Addendum 2," Oct. 2008, pp. 1-4.

* cited by examiner

*Primary Examiner* — Kwasi Karikari
(74) *Attorney, Agent, or Firm* — Barbara A. Wrigley; Oppenheimer Wolff & Donnelly, LLP

(57) ABSTRACT

The method of present invention is used for addressing a broadcast message in a trunking system, in which said trunking communication system includes a base station and mobile stations. This method includes the following steps: adding a new index of trunking broadcast time slots, with all the mobile stations that support boundless capacity group call service monitoring these trunking broadcast time slots; the base station transmitting the paging message of the boundless capacity group call in the trunking broadcast time slot; and using the group identification as the broadcast address, allowing addressing to the group identification and not a single mobile station. The method of present invention efficiently solves the problem of paging channel capacity limitations of the boundless capacity group call service supported by CDMA trunking telecommunication systems, and greatly shortens the time of group call connection.

5 Claims, 1 Drawing Sheet

METHOD FOR ADDRESSING BROADCAST MESSAGE IN A TRUNKING SYSTEM

FIELD OF THE INVENTION

The present invention relates to a mobile communication technology, and especially, relates to an addressing method in a CDMA trunking communication system.

BACKGROUND OF THE INVENTION

In the prior art, a CDMA trunking communication system combines CDMA technology with a dedicated dispatching communication system and employs a half-duplex communication method, which can achieve quick connection and support a group call method of one-to-many.

In the CDMA trunking communication system, the addressing method for an air interface paging message generally involves a mobile station (MS) identification such as IMSI that is carried in a paging channel message (such as the common paging message) which is transmitted by a base station (BSS) and is sent to a designated mobile station. Generally, a CDMA trunking communication system has an addressing method for air interfaces corresponding to each mobile station to achieve the requirement of a limited group call service of group users in each cell.

When a CDMA trunking communication system is used in commanding and dispatching systems, such as public security, fire fighting, mass gathering, and military dispatch, a large amount of users may generally gather in a certain region. For example, many thousands of users of a same group may gather in a single cell, and these type of dispatching systems are often characterized as having a large capacity and concentrated group dispatching region. According to the general practice, when a group is built, each mobile station in the group will be individually paged. The problem is that at almost the same time, a single paging channel has to transmit many thousands of paging messages, thereby making it difficult for the paging channel to bear the heavy load. Up to the present, there is no efficient solution for the addressing method in a boundless capacity group call service (i.e., a group having no limitation on the number of members of the group).

BRIEF SUMMARY OF THE INVENTION

The present invention aims to provide a method for addressing a broadcast message in a trunking system by adding a new index of trunking broadcast time slots. All mobile stations that support a boundless capacity group call service must monitor these trunking broadcast time slots. Additionally, the paging message of the boundless capacity group call transmitted by said base station is sent in the trunking broadcast time slot, which uses the group identification as the broadcast address. Because the broadcast address is according to the group identification, and not an address to a single mobile station, this overcomes the limitation on the paging channel capacity, and decreases the impact of the boundless capacity group call service to the paging channel.

The technical solution of the present invention comprises the following:

A method for addressing a broadcast message in a trunking system, and said trunking communication system including a base station and a mobile station; said method comprising the following steps:

First, adding a new trunking broadcast time slot, and requiring all the mobile stations that support the group call service to monitor the trunking broadcast time slots. The paging message of the group call transmitted by said base station is sent in the trunking broadcast time slot, which uses the group identification as the broadcast address, and thus addresses according to the group identification, and not an address to a single mobile station.

This method further comprises the following specific steps:

A. Adding an index of the trunking broadcast time slots in an operation in the maintenance center of the base station, and calculating the trunking broadcast time slot according to the index of the trunking broadcast time slots;

B. The base station notifying the mobile station of the index of the trunking broadcast time slots through an overhead message of the trunking communication system;

C. When the base station system transmits a paging message of a call, the group identification is used as the broadcast address, and the paging message addressed to the group is sent in the trunking broadcast time slot; and D. The mobile stations monitor all of the trunking broadcast time slots, so if the paging message is received, it then matches the group identification with the identification stored by the mobile station itself, to determine whether it has access to the group or not.

The method according to one embodiment of the present invention further comprises the following:

For a mobile station in a call service state, the user property information is dynamically updated directly. For a mobile station in an idle state, a call will first be made, allowing the mobile station to enter the call service state, and then the user property information will be updated.

The method according to a one embodiment of the present invention further comprises the following:

A1. The dispatching server sends a user property update message to the base station system carrying the user property information which needs to be modified and modified user identification, in addition to carrying the infatuation about the group which the mobile station belongs to;

A2. The base station system constructs a user property update message of an air interface and sends this message to each mobile station;

A3. According to the requirements in the user property update message, the mobile station, after carrying out corresponding operations such as adding, modifying, deleting and synchronizing, returns a user property update answer message which carries the results of the update to the base station system;

A4. The user property update answer message of the interface A is constructed and sent to the dispatching server by the base station system; and A5. The dispatching server judges whether the user property update is completed. If the mobile station is in the call service state before updating the user property, the call process continues; if the mobile station is in the idle state before updating the user property, the present call is released.

In one embodiment of the method according to the present invention, the group identification that serves as the broadcast address is the coding method for a short number, which only carries a local network identification and a group identification (both identifications distributed by the operator).

In one embodiment of the method according to the present invention, the group identification that serves as the broadcast address is the coding method of a long number, which is used for carrying a country code, a mobile network number, an operator identification code, a local network identification and a group identification (both identifications distributed by the operator), and a group identification type.

Compared with the prior art, the method for addressing a broadcast message in a trunking system according to one embodiment of the present invention efficiently solves the problem of paging channel capacity limitations that exist in the boundless capacity group call service supported by a CDMA trunking communication system. Because the group is addressed, all users in a group can receive the paging message in a short time, thereby greatly shortening the connection time of a group call. The method for addressing a broadcast message according to one embodiment of the present invention can not only be applied to the boundless capacity group call service, but can also be applied to other group call services in a trunking system.

DETAILED DESCRIPTION OF THE INVENTION

The method according to various embodiments of the present invention is further described in detail with reference to the accompanying drawings thereof.

The method for addressing the broadcast message in the CDMA trunking communication system according to one embodiment of the present invention utilizes a trunking communication system, which includes entities such as a base station system (BSS) and a mobile station (MS). The method comprises the following steps:

Step 1. Adding an index of the trunking broadcast time slots in an operation in the maintenance center of the base station, and calculating the trunking broadcast time slot according to the index of the trunking broadcast time slots;

Step 2. The base station notifies the mobile station of the index of the trunking broadcast time slots through an overhead message of the trunking communication system;

Step 3. When the base station BSS transmits a paging message of a call, the group identification is used as the broadcast address, and the paging message addressed to the group is sent in the trunking broadcast time slot; and Step 4. The mobile station monitors all of the trunking broadcast time slots, so if the paging message is received, it then matches the group identification with the identification stored by the mobile station itself, to determine whether it has access to the group or not.

Figure 1:
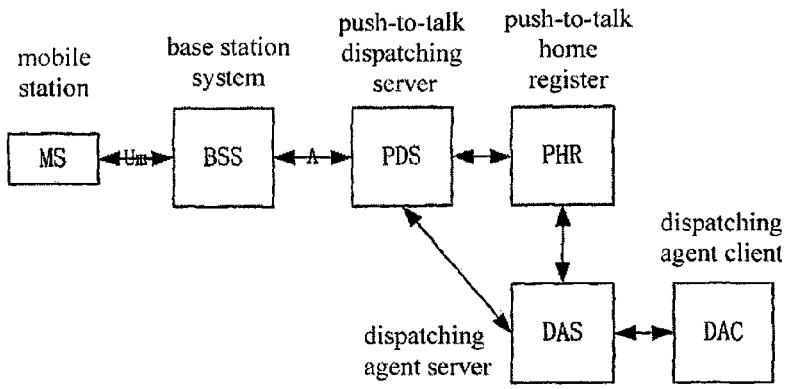
FIG. 1 is a schematic view of the CDMA trunking communication system according to one embodiment of the method of the present invention.

As shown in FIG. 1, an exemplary CDMA trunking communication environment that supports the boundless capacity group call service of the present invention is illustrated. The related trunking system includes entities such as a mobile station (MS), a base station system (BSS), a push-to-talk dispatching server (PDS), a dispatching agent server (DAS), a dispatching agent client (DAC), and a push-to-talk home register (PHR).

Figure 2:
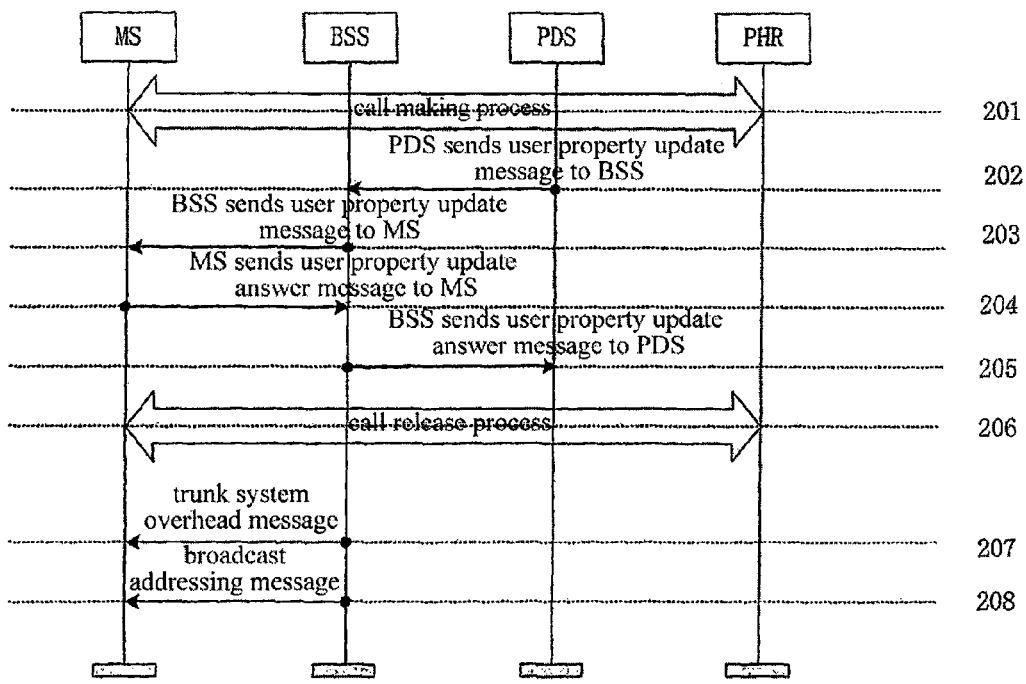
FIG. 2 is a signaling flow chart of the dynamic update of user property information and the addressing method of a broadcast message in the CDMA trunking communication system according to one embodiment of the method of the present invention.

As shown in FIG. 2, FIG. 2 depicts a signaling flow chart illustrating a dynamic update of user property information and the method for addressing a broadcast message in the boundless group call service in the CDMA trunking communication system according to one embodiment of the present invention. The entities mainly related to the method of the present invention include MS, BSS, PDS, and PHR. In the method for addressing a broadcast message, the mobile station needs to match the group identification carried in a broadcast paging message with the group identification stored by itself, to determine whether to connect the call or not. Therefore, in this embodiment of the present invention, before addressing the broadcast message, the group identification should be first stored in the mobile station by the method of dynamically updating the user property information.

The method according to one embodiment of the present invention is further described below, using a communication system based on CDMA as an example, and includes the following specific steps:

Step 201: For a mobile station in a call service state, dynamically updating the user property information directly. For a mobile station in an idle state, making a call first so that when the mobile station enters in the call service state, the user property information is updated;

Step 202: A user property update message is sent to the BSS by the PDS, and the user property update message carries the user property information that needs to be modified and a modified user identification. The message also carries the relevant information about the identification of the group where the mobile station is.

Step 203: The user property update message of an air interface is constructed and sent to the mobile station by the BSS.

Step 204: According to the requirements in the user property update message, corresponding operations such as adding, modifying, deleting and synchronizing are carried out by the mobile station. Then, a user property update answer message which carries the update result is returned to the BSS by the mobile station;

Step 205: The user property update answer message of the interface A is constructed and sent to the PDS by the BSS;

Step 206: The PDS determines if the user property update has been completed. If the mobile station is in the call service state before updating the user property, the call process continues; if the mobile station is in the idle state before updating the user property, the present call is released. Now, the mobile station has stored a list of the group identifications;

Step 207: The base station system adds an index of the trunking broadcast time slots in the operation and maintenance center, and the base station calculates the trunking broadcast time slot according to the index of the trunking broadcast time slots. The base station sends a trunking system overhead message periodically, which carries the index of the trunking broadcast time slots. The mobile station monitors all the trunking broadcast time slots according to the index of the trunking broadcast time slots;

Step 208: A boundless capacity group call paging message is sent by the base station. This message is sent in the trunking broadcast time slot, taking the trunking identification as the broadcast address and addressing according to the group. When the mobile station monitors a broadcast paging message in the trunking broadcast time slots, it extracts the group identification, matching the same with the group identification stored in the mobile station itself, and then determines whether to connect to the group or not.

In the method for addressing a broadcast message in a trunking system according to one embodiment of the present invention, the group identification as the broadcast address may have two kinds of coding methods:

(1) short number: carries only the local network identification such as the PHR identification code and the group identification distributed by the operator. The length of the broadcast addressing paging message can be shortened and the paging channel overhead can be decreased by using the short number; and (2) long number: carries a country code, a mobile network number, an operator identification code, a local network identification distributed by the operator, a group identification, and a group identification type, etc. International roaming can be supported by using a long number.

The above method for addressing a broadcast message employed in a CDMA trunking communication system according to one embodiment of the present invention achieves the requirement of boundless capacity group call service, and decreases the impact of the boundless capacity group call service to the paging channel. Meanwhile, by utilizing group addressing, all of the users in a group can receive the paging message in a short time, thereby greatly shortening the connection time of a group call. The method for addressing a broadcast message according to one embodiment of the present invention can not only be applied to a boundless capacity group call service, but also to other group call services in a trunking system.

However, it should be understood that the above are detailed description of specific embodiments and shall not be understood as providing any limitations to the scope of the present invention. Those skilled in the art could make numerous alterations to the disclosed embodiments without departing from the spirit or scope of the inventive subject matter set forth in the specification and claims.

What is claimed is:

1. A method for addressing a broadcast message in a trunk system, the trunk communication system including a base station and one or more mobile stations, the method comprising:
   adding a new trunk broadcast time slot;
   monitoring trunk broadcast time slots by all mobile stations that support group call service;
   transmitting a paging message of the group call by said base station in the trunk broadcast time slot, wherein the paging message uses group identification as a broadcast address, and addresses according to the group identification;
   sending to the base station system by a dispatching server a user property update message carrying the user property information that needs to be modified and a modified user identification, the message carrying information about the identification of the group where the mobile station is;
   constructing and sending by the base station system to each mobile station the user property update message of an air interface;
   performing by the mobile station the operations of adding, modifying, deleting and synchronizing according to the requirements in the user property update message;
   returning from the mobile station a user property update answer message carrying the update results to the base station system;
   constructing and sending by the base station system a use a user property update answer message of an interface to the dispatching server;
   determining by the dispatching server whether the user property update is successful;
   continuing the call process if the mobile station is in a call service state before updating the user property; and
   releasing the present call if the mobile station is in an idle state before updating the user property, then the present call is released.

2. The method according to claim 1, further comprising:
   adding an index of trunk broadcast time slots in an operation and maintenance center of the base station;
   calculating the trunk broadcast time slot according to the index of the trunk broadcast time slot;
   the base station notifying the mobile station of the index of the trunk broadcast time slot by an overhead message of the trunk communication system;
   using the group identification as the broadcast address and sending the paging message which addresses according to the group in the trunk broadcast time slot when the base station system transmits a paging message of a call;
   the mobile station monitoring all trunk broadcast time slots;
   matching the group identification with the identification stored within the mobile station if the paging message is received, and determining whether to connect into the group or not.

3. The method according to claim 1, further comprising:
   dynamically updating user property information directly for a mobile station in a call service state; and
   making a call for a mobile station in an idle state to update user property information when the mobile station enters in the call service state.

4. The method according to claim 1, wherein the group identification which serves as the broadcast address is the coding method for a short number, and only carries the local identification and the group identification distributed by the operator.

5. The method according to claim 1, wherein the group identification which serves as the broadcast address is the coding method for a long number, and carries a country code, a mobile network number, an operator identification code, a local identification and a group identification distributed by the operator, and a group identification type.

* * * * *